United States Patent [19]
Gerber et al.

[11] Patent Number: 5,877,255
[45] Date of Patent: Mar. 2, 1999

[54] KIND OF POLYHYDROXYL COMPOUNDS SUITABLE FOR THE POLYURETHANE SYNTHESIS

[75] Inventors: Ulrich Gerber, Zürich; Paul Schelbert, Ottenbach; Werner Meyer, Zollikon, all of Switzerland

[73] Assignee: Sika AG vorm. kaspar Winkler & Co., Switzerland

[21] Appl. No.: 824,478

[22] Filed: Mar. 26, 1997

[51] Int. Cl.⁶ .................. C08J 3/00; C08K 3/00; C08L 75/00; C08L 51/00
[52] U.S. Cl. ............ 524/590; 428/423.1; 524/539; 528/288; 528/295.5
[58] Field of Search .................... 524/539, 590; 528/288, 295.5

[56] References Cited

U.S. PATENT DOCUMENTS

| | | | |
|---|---|---|---|
| 4,048,104 | 9/1977 | Svoboda et al. | 260/2.5 AN |
| 4,223,068 | 9/1980 | Carlstrom et al. | 428/310 |
| 4,417,001 | 11/1983 | Svoboda et al. | 521/114 |
| 5,252,615 | 10/1993 | Rao et al. | 521/48.5 |

FOREIGN PATENT DOCUMENTS

| | | |
|---|---|---|
| 180973A2 | 5/1986 | European Pat. Off. . |
| 504454A1 | 9/1992 | European Pat. Off. . |
| 2141041 | 1/1973 | France . |
| 125037 | 3/1977 | Germany . |
| 544320 | 12/1973 | Switzerland . |
| WO95/24442 | 9/1995 | WIPO . |

*Primary Examiner*—Patrick D. Niland
*Attorney, Agent, or Firm*—Burns, Doane, Swecker & Mathis, L.L.P.

[57] ABSTRACT

A binder producible by reaction of aromatic polyesters with polyols and fatty acid esters as well as a process for the production of such a binder are described.

The inventive binder is particularly suitable for the production of polyurethanes and results in floor coverings with especially favorable properties.

23 Claims, No Drawings

KIND OF POLYHYDROXYL COMPOUNDS SUITABLE FOR THE POLYURETHANE SYNTHESIS

CROSS REFERENCE TO RELATED APPLICATIONS

This application claims the priority of Swiss Application No 798/96, filed 27 Mar. 1996, the disclosure of which is incorporated herein by reference in its entirety.

FIELD OF THE INVENTION

The present invention concerns a novel kind of polyhydroxyl compounds, their preparation and use for the formulation of reactive polyurethanes, particularly coatings and floor coverings (floorings).

BACKGROUND OF THE INVENTION

Polyurethanes formed by polyaddition of polyisocyanates and polyhydroxyl compounds are largely used as reactive one- or two-component systems as adhesives, sealing materials, decoration coatings, protective coatings and floorings. Thereby, they have to meet very different requirements. Of particular importance are the storage stability prior to application, the potlife and processing viscosities during the application and the reactivity, the mechanical and thermal properties as well as the chemical resistance after the application. For coatings and floor coverings the aesthetic properties are often of decisive importance. The surfaces, dependent on the application must have different degrees of gloss, from glossy and satiny to mat. The surfaces must be completely free of deficiencies, thus defects such as pinholes, pigment floating, Bernard cells, rub-out-effects, bad levelling, craters, bubbles and others are not acceptable. It is generally known that achieving all technical requirements on the one hand necessitates an adjustment of all components of a formulation, an the other hand it is largely dependent on the used polyhydroxyl compounds.

In order to achieve the above mentioned requirements, the constituents used in the formulation must be compatible with each other. Besides the exclusively technical requirements imposed on said products also economical aspects are of great importance. The relation between the price and the performance of a product is often decisive for its possible use. For polyurethane pastes the costs of the whole formulation are largely determined by the costs of the polyhydroxyl compounds used. Additionally, the whole environmental impact of the product receives growing attention. In several countries, the legislation intends to reduce the environmental impact of commercial products in order to protect the environment and the raw material resources. For this reason, some governments require environmental impact assessment (EIA) reports to be submitted to the authorities before introducing new products into the market. In this context, minimizing the formation of carbon dioxide during the whole life cycle of a product (from production to waste disposal) is of utmost importance.

This can be achieved e.g. by extensive use of recycled or naturally growing raw materials.

In two component polyurethane formulations (component A: polyol, component B: isocyanate) for coatings (floor coverings, protective coatings, corrosion inhibiting coatings) a large variety of different polyhydroxyl compounds such as e.g. polypropylene glycol, polyethylene glycol, polyester, polycarbonate etc. are applicable.

It is known that the use of castor oil as polyol component results in materials with good properties (particularly good deficiency free surfaces, long potlife followed by fast curing). Usually castor oil is used together with other polyethylene oxide-based polyols or polypropylene oxide-based polyols The GDR (former German Democratic Republic) patent No 125 037 describes the production of polyurethane pastes, for instance a mixture of recycled, i.e. alcoholized, polyethylene terephthalate (PET) and castor oil. However, the use of castor oil together with aromatic polyester polyols as a physical mixture, as it is for example described in the above mentioned patent, is not suitable for the production of polyurethane coatings and floor coverings, since castor oil is chemically incompatible with the polyester leading to a separation. Thus, poor mechanical properties (low abrasion and scratch resistances) are obtained, particularly, however, poor surface properties (floating of pigments, surface defects) and insufficient storage stability (sedimentation or the fillers). This is due i.a. to the chemical incompatibility of the polyol components. Also, the processability is insufficient for the use as coatings and floor coverings due to the high viscosity of the binders described in the above mentioned patent.

Processes for recycling PET materials for the production of plastics are known for along time already. The U.S. Pat. No. 5,252,615 of Sherwin-Williams Co. describes the reaction of alcoholysis products of PET with e.g. acids under formation of acid group containing products with different acid group contents. Such products are particularly suitable for the production of aqueous, radically curing acrylic coatings The publication of Eastman Chemicals No N-292 B describes the production of unsaturated polyester resins out of PET. The use of conversion products of polyethylenterephthalate, PET, and polyols (de-polymerized PET) as raw material for the production of PU-compositions (particularly foams) is also known. For example the U.S. Pat. No. 4,223,068, No 4,417,001 and No 4,048,104 describe the production of hard polyurethane foams made out of recycled PET. The use of such binders, however, is not suitable for the formulation of coatings and floor coverings. The use of such aromatic polyols mostly leads to brittle products with poor aesthetic and insufficient processability.

The problem to be solved by the present invention thus was to produce a novel kind or polyhydroxyl compounds having a minimal negative impact on the environment allowing to better meet the sometimes contradictory requirements expected from polyurethane compositions, particularly coatings and floor coverings, than the state-of-the-art compounds do and having a more advantageous environmental impact. Said contradictory requirements include e.g. excellent mechanics, good chemical resistance, short processing times and good storage stabilities. In particular, the goals of the present invention were the production of polyhydroxyl compounds which can be synthesized at least in part out of low-cost, recycled raw material, possibly in combination with naturally regrowing raw materials, and the formulation of floor coverings and coatings enabling

- excellent mechanical properties such as high tensile strengths and high modulus in tension at high elongation, good abrasion resistances, high compressive strengths, high scratch resistances
- defect-free, aesthetic surfaces
- good chemical resistance.

SHORT DESCRIPTION OF THE INVENTION

An object or the present invention is to provide reactive hydroxyl groups comprising binders directly obtained from the conversion of aromatic groups comprising polyesters, such as PET, with aromatic or aliphatic polyols and/or aminoalcohols and fatty acid esters, such as castor oil.

A further object of the present invention is to provide a production process for the inventive binder which can be carried out without the addition of any further solvent.

Still a further object of the present invention is to provide a polyurethane composition comprising the inventive binder and a diisocyanate or a polyisocyanate, particularly a polyurethane composition that is suitable for the production of floor coverings and coatings.

The inventive binder comprises the conversion product of aromatic polyesters such as polyethylene naphthalate (PEN) or polyethylene terephthalate (PET) or their copolycondensation products with aromatic or aliphatic diols and/or polyols and/or aminoalcohols such as fatty acid esters, usually in the presence of unreacted fatty acid esters.

DETAILED DESCRIPTION OF THE INVENTION

The inventive binder is produced on the basis of recycled aromatic polyesters or mixtures of recycled aromatic polyesters. Such polyesters are for example polyethylene naphthalate (PEN) or polyethylene terephthalate (PET). Polyethylene terephthalate presently is the more interesting starting material because of the large quantities in which it is recycled.

The binder comprises the conversion product of aromatic polyesters or their copolycondensates with aromatic or aliphatic diols and/or polyols and/or aminoalcohols as well as fatty acids. The binder usually comprises unreacted fatty acid esters.

The reaction product of polyester, diol or polyol or aminoalcohol as well as fatty acid esters is represented by one of the following formulas:

$$H-[O-R_1-\underset{O}{\underset{\|}{C}}-]_n A-(R_2-O-\underset{O}{\underset{\|}{C}}-R_3)_x \quad (I)$$
$$(R_4)_y$$

and/or $$R_3-O+O-R_1-\underset{O}{\underset{\|}{C}}\Big]_n A-(R_2-OH)_x \quad (II)$$
$$(R_4)_y$$

in which $$[O-R_1-\underset{O}{\underset{\|}{C}}-]$$

is a polyester repeating unit comprising at least one aromatic group, n is an integer from 1 to 4, A is oxygen or nitrogen, X is 1 or 2 and y=0 or 1, whereby for A=N x+y is 2 and whereby for A=O x is 1 and y is 0, $R_1$ is an aromatic polyester segment, particularly the polyester segment of the condensation product of an aromatic diacid and an optionally substituted aliphatic glycol, $R_2$ is an optionally OH substituted, aliphatic, cyclic or aromatic $C_1-C_8$ hydrocarbon chain or an optionally OH substituted dialkylether, trialkylether or tetraalkylether group or an optionally OH substituted ester or polyester of at least one aliphatic or aromatic carboxylic acid with aliphatic alcohols and/or glycols, $R_3$ is a saturated or unsaturated $C_{11}-C_{21}$ alkylradical substituted by at least one OH group, and $R_4$ is hydrogen or hydroxyalkyl Beside the compounds of formula (I) and/or formula (II) the inventive binder comprises at least one compound selected from the group comprising $$HO-R_2-OH, \quad HO-R_2-NH_2, \quad HO-R_2-\underset{H}{\underset{|}{N}}-R_2-OH$$

$$HO-R_2-O-\underset{O}{\underset{\|}{C}}-R_3,$$

$$O-(O-\underset{O}{\underset{\|}{C}}-R_3)_p,$$

wherein $R_2$ and $R_3$ are as described above, Q is an optionally OH substituted $C_3-C_6$ alkylradical and p is 1 to 4

A preferred binder is one in which

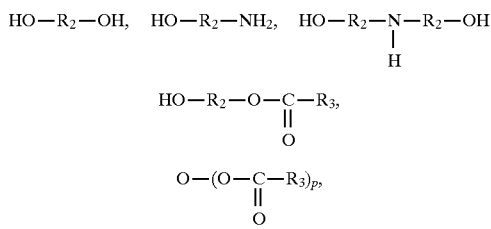

or

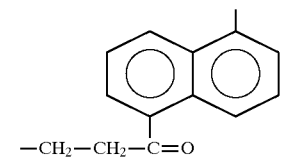

or

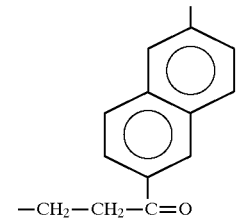

$R_2$ comprises $-CH_2-CH_2-O-CH_2-CH_2-O-CH_2-CH_2-$ $R_3$ is $CH_3(CH_2)_5-CHOH-CH_2-(CH)_2-(CH_2)_7-$ Q is $$-H_2C-\underset{|}{CH}-CH_2-$$

and p is 3.

In a particularly preferred embodiment $R_2$ is selected from the group comprising $$-(CH_2-CH_2-O)_3-\underset{O}{\underset{\|}{C}}-(CH_2)_4-\underset{O}{\underset{\|}{C}}-(O-CH_2-CH_2)_3-$$

$$-(CH_2-CH_2-O)_3-\underset{O}{\underset{\|}{C}}-(CH_2)_4-\underset{O}{\underset{\|}{C}}-O-CH_2-CH_2-$$

Most particularly preferred as far as an optimized compatability with at the sane time good reactivity is concerned is an $R_2$ which is an ethoxylated neopentyl glycol particularly an ethoxylated neopentyl glycol with 1.5 to 3 ethyleneoxide repetition units.

The inventive binder can be varied with regard to its features not only by the amount of unreacted fatty acid ester but optionally also by modifying the prepolymer comprised in the binder by reaction with diacids.

As an aromatic group comprising polyester PET is—as already mentioned above—a preferred starting material since it is available as a recycling product in large quantities, e.g. in the form of used bottles. Such recycled PET can be used in the form of whole, emptied bottles or, preferably, in the form of crushed pieces, particularly preferred in the form of crushed and washed pieces.

Preferred polyols are in particular ethylene glycol; diethylene glycol; triethylene glycol; tetraethylene glycol; tripropylene glycol; 1,4-butanediol; 1,6-hexanediol; and glycerin (1,2,3-propanetriol). Further usable polyols with favorable properties are: Dipropylene glycol; 2,2,4-trimethyl-1,3-pentanediol; neopentyl glycol; 1,2-propane glycol; 1,3-propane glycol; 1,4-butane glycol; 1,3-butane glycol; 2,3-butane glycol; 1,5-pentanediol; 2-methyl-1,5-pentanediol; 2-methyl-2'-ethyl-1,3-propanediol; bisphenol-A-ethoxylate; dodecahydrobisphenol-A; 2,2'-thio-diethanol; dimethylol propionic acid; hydroxy terminated polybutadienes; 1,4-cyclohexane dimethanol; 1,2-cyclohexane dimethanol; 1,3-cyclohexane dimethanol, 1,4-bis(2-hydroxyethoxy) cyclohexane; norbornylene glycol; 1,4-benzenediethanol; 2,4-dimethyl-2-ethylenehexane-1,3-diol; 2-butene-1,4-diol; trimethylol ethane; trimethylol propane, ethoxylated trimethylol propane; trimethylol propane monoallylether; trimethylol hexane; 1,2,4-butanetriol; dipentaerythritol; pentaerythrite; dicyclopentadiene dimethanol; ethoxylated dimethyl hydantoin.

It has now been shown that the compatability of the binder is improved by the presence of short chain alkyl groups, particularly methyl groups, in the glycol while the reactivity is positively influenced by the presence of primary hydroxyl groups. Thus polyethylene glycol has a good reactivity with poorer compatability whereas polypropylene glycol has very good compatability with poorer reactivity A glycol combining primary hydroxyl groups with methyl groups is the neopentyl glycol. Because of its low molecular weight, however, the use of neopentyl glycol leads to an unfavorable OH-equivalent. Said OH-equivalent can be improved by ethoxylating the neopentyl glycol, particularly by the incorporation of 1.5 to 3 ethylene oxide repetition units.

In addition or instead of polyols also aminoalcohols can be used. Preferred aminoalcohols are diethanolamine, triethanolamine, triisopropanolamine.

By using alcohols or aminoalcohols with two or more functional groups faster strength development and higher final strengths can be achieved.

It has furthermore been found that the flexibility of a floor covering or a coating can be improved when at least one monofunctional alcohol, particularly a $C_8$ to $C_{12}$ alcohol is incorporated in the inventive binder, substituting a part of the difunctional or polyfunctional alcohol or aminoalcohol. Said part usually ranges from 1 to 10% by mole of the difunctional or polyfunctional alcohol or aminoalcohol.

Suitable fatty acid esters are esters of saturated and unsaturated $C_{12}$ to $C_{22}$ fatty acids carrying hydroxyl groups, particularly triglycerides. Particularly preferred is castor oil.

For a possible after-esterification with dicarboxylic acids preferred are adipic acid, azelaic acid, sebacic acid and dodecane dicarboxylic acid.

Reactive binders with a PET portion of 14% to 24% by weight have proved to be particularly suitable.

The production of the reactive binder preferably starts from a PET material in the form of crushed and washed pieces. Using whole, emptied bottles is possible but less suitable.

The process also being a subject of the present invention is characterized in that the hydroxyl number in the binder is not changed by the alcoholysis and trans-esterification and in that the process proceeds without the addition of solvents. The hydroxyl number is only reduced by a possible after-esterification with dicarboxylic acids.

To the PET material one or more premixed polyols are added in a molar ratio of from 0.2 (polyol/aminoalcohol) to 1 (repetitive PET unit=(PET)) to 1.8 (polyol/aminoalcohol) to 1 (PET). Particularly preferred are molar ratios of 0.5 to 1.5 (polyol/aminoalcohol): (PET). In an especially preferred embodiment a polyol mixture comprising 80% triethylene glycol or, in an even more preferred embodiment, 80% ethoxylated neopentyl glycol (2,2-dimethyl-1,3-propanediol), is added to the polyester material in amounts of 10 to 30% by weight referred to the whole composition or 50 to 120% by weight of the amount of PET. To said mixture 0.1 to 2% of a catalyst are added. Suitable catalysts are usual esterification catalysts such as tin(II) caprylate, cobalt acetate, manganese(II)acetate, calcium hydroxide, and organic tin catalysts such as dibutyl tinoxide. Particularly suitable are zinc acetate dihydrate and cobalt naphthenate and tetrabutyl orthotitanate. Then the mixture is heated under stirring and preferably under inert gas atmosphere or vacuum at a temperature of 180° C. to 230° C. for 0.5 to 4 hours. At this stage the mixture can be after-esterified in an intermediate step using an aliphatic dicarboxylic acid at 200° C. to 230° C.

The after-esterification is preferably made with up to 10% sebacic acid or adipic acid. Particularly preferred are after-esterifications with 2 to 10% adipic acid referred to the total amount of the mixture. Following the alcoholysis and the after-esterification castor oil is added in an amount of 11 to 800 parts by weight per 100 parts by weight of the prereacted mixture, i.e. 0.08–11.0 moles "fatty acid" per mole PET. Preferred are weight-ratios of 70 to 30 to 30 to 70 of castor oil to prereacted mixture. Particularly preferred is a mixture comprising 40–70% by weight of castor oil. Generally the ratio of moles OH: moles castor oil is 0.04 to 2.82, especially 0.83 to 1.2.

Following the above mentioned step the mixture is again heated under stirring for 0.5 to 2 hours at 180° to 210° C. After cooling to room temperature the obtained binder must be separated from introduced impurities, e.g. foreign matter, by filtration, especially when using not already regenerated PET-material.

Because of the reaction of the possibly after-esterified alcoholysis product with a fatty acid ester, particularly a triglyceride, the amount of hydroxyl groups in the whole system is kept constant, thus leading to especially advantageous products. Additionally, the product comprises almost no free acid groups, which are undesired, since they affect the desired and aspired hydrophoby of the product.

The binders that are e.g. produced according to the above described processes are particularly suitable for the use as coreactants of polyisocyanates for the production of PU compositions, especially for floor coverings, coatings and casting compositions.

The use of the inventive binders together with aromatic or aliphatic polyisocyanates results in coatings with excellent mechanical properties. It is possible to realize high tensil strengths (10 MPa up to 40 MPa) with at the same time high stress-strain (more than 10% up to more than 100%). Such coatings are furthermore characterized by surprisingly high abrasion resistances and scratch resistances with at the same time beautiful (glossy to satiny-mat, defect free) surfaces. The compatability of the binder with silicate and carbonate fillers and pigments is also excellent, leading to a good storage stability (no sedimentation of the fillers). A further advantage of the process is that the PET material used can be used in uncleaused form and in large pieces. Thus, it is possible to directly use the whole used beverage bottles with labels and parts made of other plastics (covers, bottoms) without prior separation of non PET materials and without a reduction in quality. A further advantage of the described binder is that, because of the advantageous hydroxyl equivalents and the low costs, it is possible to formulate products that do not comprise plasticizers. Plasticizers in polyurethane formulations are primarily used in order to dilute the binder with inert materials, thereby reducing the costs of the formulation, but also in order to reduce the viscosity. Since, however, the plasticizers are not chemically bound in the polymerstructure, they can be eluded or migrate out of the product resulting in serious disadvantages such as delaminations or degradations of the surfaces.

In the following the invention is further described by examples. Said examples are not intended to restrict the scope of the invention in any way.

EXAMPLE 1
(without after-esterification)

To about 400 g of crushed PET pieces from used beverage-bottles are added about 276 g triethylene glycol and 4 g zincacetate dihydrate and the mixture is mechanically stirred for 4 hours at 217° C. in a glass reactor under nitrogene. Then about 1320 g of castor oil are added and the mixture is heated for another 2 hours at 195°–200° C. under vacuum. Then it is cooled to room temperature and filtered. A binder with an OH-equivalent of about 266 and a viscosity of 1850±200 mPas at 20° C., density 1.0 kg/l is obtained. The reaction of the above described binder with MDI (methylenediphenyldiisocyanate) results in coatings with tensile strengths of >25 MPa and stress-strains of 68% and excellent abrasion and scratch resistance.

EXAMPLE 2
(without after-esterification)

To about 400 g of crushed PET pieces from used beverage-bottles 400 g of triethylene glycol and 4 g zincacetate dihydrate are added and the mixture is mechanically stirred for about 4 hours at 217° C. in a glass reactor under nitrogen. Then about 1320 g castor oil are added and the mixture is heated under vacuum for another 2 hours at 195°–200° C. Then it is cooled to room temperature and filtered. A binder with an OH-equivalent of about 224 and a viscosity of 1600±200 mPas at 20° C., density 1.0 kg/l is obtained. The reaction of the above described binder with MDI results in coatings with tensile strengths of >25 MPa and stress-strains of 68% and excellent abrasion and scratch resistance.

EXAMPLE 3
(with after-esterification with adipic acid)

To 400 g of crushed PET pieces of used beverage-bottles about 440 g triethylene glycol, 36 g glycerin and 4 a zincacetate dihydrate are added and the mixture is mechanically stirred under nitrogene in a glass reactor for about 4 hours at 217° C. Then an after-esterification is performed with 160 g of adipic acid for 4 hours at 217° C. Then about 960 g castor oil are added and the mixture is heated for another 2 hours at 195°–200° C. under vacuum. Then it is cooled to room temperature and filtered. A binder with an OH-equivalent of about 258 and a viscosity of 2500 to 3000 mPas at 20° C., density 1.0 kg/l is obtained. The reaction of the above described binder with MDI results in coatings with tensile strengths of >30 MPa and stress-strains of 50% and excellent abrasion resistance and scratch resistance.

EXAMPLE 4
(with after-exterification with adipic acid and aminoalcohol branching)

To 400 g of crushed PET pieces from used beverage-bottles about 440 g triethylene glycol, 36 g diethanolamine and 4 g zincacetate dihydrate are added and the mixture is mechanically stirred under nitrogene in a glass reactor for about 4 hours at 217° C. Then an after-esterification is performed with 160 g of adipic acid for 4 hours at 217° C. Then about 960 g castor oil are added and the mixture is heated for another 2 hours at 195°–200° C. under vacuum. Then it is cooled to room temperature and filtered. A binder with an OH-equivalent of about 266 and a viscosity of 2500 to 3000 mPas at 20° C., density 1.0 kg/l is obtained.

The reaction of the above described binder with MDI (methylene diphenyldiisocyanate) results in coatings with tensile strengths of >32 MPa and stress-strains of 40% and excellent abrasion resistance and scratch resistance.

EXAMPLE 5
(Glycolysis of PET with ethoxylated neopentyl glycol)

To about 440 g of crushed PET pieces from used beverage-bottles are added about 560 g ethoxylated neopentyl glycol (degree of ethoxylation 2.5) and 8 g zincacetate dihydrate and the mixture is mechanically stirred for 1 hour at 230° C. in a glass reactor under nitrogene. Then about 976 g of castor oil are added and the mixture is heated for another 1 hour at 200° C. under vacuum. Thereby about 1% distillate is distilled off. Then it is cooled to room temperature and filtered. A binder with an OH-equivalent of about 257 and a viscosity of 2400 mPas is obtained. The reaction of the above described binder with MDI (methylenediphenyldiisocyanate) results in coatings with tensile strengths of >25 MPa and stress-strains of 70% and excellent abrasion and scratch resistance.

EXAMPLE 6
(Glycolysis of PET with dipropylene glycol and ethoxylated trimethylolpropane)

To about 400 g of crushed PET pieces from used beverage-bottles are added about 240 g dipropylene glycol and 160 g ethoxylated trimethylolpropane (degree of ethoxylation 7) and 8 g zincacetate dehydrate and the mixture is mechanically stirred for 1 hour at 230° C. in a glass reactor under nitrogene. Then about 1200 g of castor oil are added and the mixture is heated for another 1 hour at 200° C. under vacuum. Thereby about 1% distillate is distilled off. Then it is cooled to room temperature and filtered. A binder with an OH-equivalent of about 257 and a viscosity of 2400 mPas is obtained. The reaction or the above described binder with MDI (methylenediphenyldiisocyanate) results in coatings with tensile strengths of >30 MPa and stress-strains of 40% and excellent abrasion and scratch resistance.

We claim:
1. Binder which comprises at least one compound of formula (I)

$$H-[O-R_1-\underset{O}{\underset{\|}{C}}-]_n\underset{(R_4)_y}{\overset{|}{A}}-(R_2-O-\underset{O}{\underset{\|}{C}}-R_3)_x \quad (I)$$

and/or formula (II)

$$R_3-\underset{O}{\underset{\|}{C}}+O-R_1-\underset{O}{\underset{\|}{C}}\underset{(R_4)_y}{\overset{|}{+_n A}}-(R_2-OH)_x \quad (II)$$

in which $$[O-R_1-\underset{O}{\underset{\|}{C}}-]$$

is a polyester repeating unit comprising at least one aromatic group;

n is an integer from 1 to 4;

A is oxygen or nitrogen;

X is 1 or 2 and y=0 or 1, whereby for A=N x+y is 2 and whereby for A=O x is 1 and y is 0;

$R_1$ is an aromatic polyester segment;

$R_2$ is an optionally OH substituted, aliphatic, cyclic or aromatic $C_1$–$C_8$ hydrocarbon chain or an optionally OH substituted dialkylether, trialkylether or tetraalkylether group or an optionally OH substituted ester or polyester of at least one aliphatic or aromatic carboxylic acid with aliphatic alcohols and/or glycols;

$R_3$ is a saturated or unsaturated $C_{11}$–$C_{21}$ alkylradical substituted by at least one OH group; and $R_4$ is hydrogen or hydroxyalkyl in simultaneous presence of at least one compound selected from the group consisting of $$HO-R_2-OH, \quad HO-R_2-NH_2, \quad EO-R_2-\underset{H}{\overset{|}{N}}-R_2-OH$$

$$HO-R_2-O-\underset{O}{\underset{\|}{C}}-R_3, \quad Q-(O-\underset{O}{\underset{\|}{C}}-R_3)_p,$$

wherein $R_2$ and $R_3$ are as described above, Q is an optionally OH substituted $C_3$ to $C_6$ alkyl radical and p is 1 to 4.

2. Binder according to claim 1, wherein $R_1$ is the condensation product of an aromatic diacid and an aliphatic glycol.

3. Binder according to claim 1, wherein $R_1$ is $$-CH_2-CH_2-O-\underset{O}{\underset{\|}{C}}-\phantom{xx}$$

or $$-CH_2-CH_2-C=O$$

or $$-CH_2-CH_2-C=O$$

$R_2$ comprises $-CH_2-CH_2-O-CH_2-CH_2-O-CH_2-CH_2-$ $R_3$ is $CH_3(CH_2)_5-CHOH-CH_2-(CH)_2-(CH_2)_7-$ Q is $$-H_2C-\underset{|}{CH}-CH_2-$$

and p is 3.

4. Binder according to claim 1, wherein $R_2$ is selected from the group consisting of $$-(CH_2-CH_2-O)_3-\underset{O}{\underset{\|}{C}}-(CH_2)_4-\underset{O}{\underset{\|}{C}}-(O-CH_2-CH_2)_3-$$

$$-(CH_2-CH_2-O)_3-\underset{O}{\underset{\|}{C}}-(CH_2)_4-\underset{O}{\underset{\|}{C}}-O-CH_2-CH_2-$$

5. Binder according to claim 1, wherein $R_2$ is ethoxylated neopentyl glycol.

6. Binder according to claim 5, wherein $R_2$ is ethoxylated neopentyl glycol with 1.5 to 3 ethylene oxide repeating units.

7. Binder according to claim 19, which comprises 14 to 24% by weight referred to the total weight of the binder of $O-R_1-CO$.

8. Process for the production of a binder according to claim 1, wherein an aromatic polyester with the repeatedly occurring repeating unit $$-[O-R_1-\underset{O}{\underset{\|}{C}}]-$$

wherein $R_1$ is as described above, is first reacted with a polyol of the formula $$HO-R_2-OH,$$

wherein $R_2$ is as described above, and then with a fatty acid ester of the formula $$Q-(O-\underset{O}{\underset{\|}{C}}-R_3)_p,$$

wherein Q, $R_3$ and p are described above.

9. Process according to claim 8, wherein the product of the reaction of the polyester with at least one polyol is first after-esterified with a dicarboxylic acid and then reacted with at least one fatty acid ester.

10. Process according to claim 8, wherein polyethylene terephthalate, polyethylene naphthalate or their copolycondensates are used in amounts of 14 to 24% by weight referred to the total weight of the binder.

11. Process according to claim 8, wherein a polyol or a polyol mixture of the formula HO—R$_2$—OH, wherein R$_2$ has the above mentioned meaning, is used in an amount of from 10 to 30% by weight referred to the total weight of the binder.

12. Process according to claim 11, wherein the polyol mixture comprises at least 80% by weight of triethylene glycol.

13. Process according to claim 8, wherein 40–70% by weight referred to the total weight of the binder of a fatty acid ester of formula

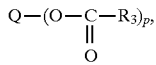

wherein Q, R$_3$ and p have the above mentioned meaning, are used.

14. Process according to claim 8, wherein 40–70% by weight referred to the total weight of the binder of castor oil are used.

15. Process according to claim 9, wherein for the after-esterification up to 10% by weight of sebacic acid or adipic acid are used.

16. Process according to claim 15, wherein for the after-esterification 2–10% by weight of adipic acid are used.

17. Process according to claim 8, wherein the reaction of the polyester with the polyol is performed in the presence of a catalyst and at a temperature of 180° C. to 230° C., optionally under inert gas, and in that a possible after-esterification is performed in a temperature range of from 200° C. to 230° C. and the reaction with the fatty acid ester is performed at a temperature of 180° C. to 210° C., optionally under vacuum.

18. Process according to claim 8, wherein a part of the difunctional or polyfunctional alcohol HO—R$_2$—OH is substituted by a monofunctional alcohol.

19. Process according to claim 18, wherein a part of the difunctional or polyfunctional alcohol HO—R$_2$—OH is substituted by a monofunctional C$_8$ to C$_{12}$ alkanol.

20. Process for the production of polyurethanes, wherein a binder according to claim 19 is reacted with a hardener.

21. Process according to claim 20, wherein the hardener is an isocyanate based hardener.

22. Process according to claim 21, wherein the hardener comprises methylenediphenyldiisocyanate.

23. Process for the production of a floor covering, wherein a binder according to claim 1 is reacted with a hardener to form a polyurethane composition used to produce a floor covering.

* * * * *